United States Patent
Liu et al.

(10) Patent No.: US 6,637,575 B2
(45) Date of Patent: Oct. 28, 2003

(54) APPARATUS AND METHOD FOR THIN PROFILE RATCHET ACTUATOR

(75) Inventors: Jintao Liu, Windsor (CA); Alfred Stadlbauer, Puchenau (AT)

(73) Assignee: L & P Property Management Company, South Gate, CA (US)

( * ) Notice: Subject to any disclaimer, the term of this patent is extended or adjusted under 35 U.S.C. 154(b) by 0 days.

(21) Appl. No.: 10/005,725

(22) Filed: Nov. 7, 2001

(65) Prior Publication Data

US 2003/0061899 A1 Apr. 3, 2003

Related U.S. Application Data

(63) Continuation-in-part of application No. 09/972,268, filed on Oct. 3, 2001.

(51) Int. Cl.[7] .............................. B60N 2/16; B60N 2/22
(52) U.S. Cl. .................... 192/223.2; 192/15; 192/19
(58) Field of Search ................... 192/15, 17 R, 192/19, 223.1, 223.2; 74/143; 297/361.1, 362, 374

(56) References Cited

U.S. PATENT DOCUMENTS

| | | | |
|---|---|---|---|
| 823,971 A | 6/1906 | Remondy | |
| 3,631,951 A | 1/1972 | Quenneville | 192/8 C |
| 3,726,370 A | 4/1973 | Hubbard, Jr. | 192/8 C |
| 3,759,358 A | 9/1973 | Quenneville | 192/8 C |
| 3,796,292 A | 3/1974 | Harrison | 192/8 C |
| 3,876,184 A | 4/1975 | Eudy | 254/150 R |
| 4,014,422 A | 3/1977 | Morishita | 192/67 R |
| 4,316,631 A | 2/1982 | Lenz et al. | 297/284 |
| 4,354,709 A | 10/1982 | Schuster | 297/284 |
| 4,494,709 A | 1/1985 | Takada | 242/107.6 |
| 4,561,606 A | 12/1985 | Sakakibara et al. | 242/107 |
| 4,614,257 A | 9/1986 | Harada et al. | 192/8 C |
| 4,778,138 A | 10/1988 | Yamada | 248/421 |
| 4,786,110 A | 11/1988 | Mahling et al. | 297/362 |
| 4,817,771 A | 4/1989 | Iten | 192/16 |
| 5,010,780 A | 4/1991 | Hatfield | 74/501.5 R |
| 5,050,930 A | 9/1991 | Schuster et al. | 257/284 |
| 5,080,434 A | 1/1992 | Locher | 297/301 |
| 5,186,412 A | 2/1993 | Park | 242/245 |
| 5,197,780 A | 3/1993 | Coughlin | 297/284.7 |
| 5,211,368 A | 5/1993 | Kitamura | 248/292.1 |
| 5,217,278 A | 6/1993 | Harrison et al. | 297/284.7 |
| 5,248,017 A | 9/1993 | Schwarzbich | 192/8 R |
| 5,382,076 A | 1/1995 | Scheck et al. | 297/354.12 |
| 5,397,164 A | 3/1995 | Schuster et al. | 297/284.1 |
| 5,449,219 A | 9/1995 | Hay et al. | 297/284.4 |
| 5,522,488 A | 6/1996 | Schwarzbich | 192/8 R |
| 5,567,010 A | 10/1996 | Sparks | 297/284.4 |
| 5,567,011 A | 10/1996 | Sessini | 297/284.7 |

(List continued on next page.)

FOREIGN PATENT DOCUMENTS

| | | | |
|---|---|---|---|
| DE | 29 47 472 | 8/1980 | B60N/1/00 |
| EP | 0 006 840 B1 | 2/1982 | A47C/23/00 |
| EP | 0 322 535 A1 | 7/1989 | A47C/7/46 |
| EP | 0 751 030 A1 | 1/1997 | B60N/2/22 |
| EP | 0 751 032 B2 | 1/2001 | B60N/2/22 |
| EP | 0 751 031 B1 | 9/2001 | B60N/2/22 |
| EP | 0 885 164 B1 | 7/2002 | B65H/75/30 |
| FR | 2 809 999 A1 | 12/2001 | B60N/2/16 |
| WO | WO 99/05000 | 2/1999 | B60N/2/06 |
| WO | WO 02/11584 A1 | 2/2002 | A37C/8/46 |

OTHER PUBLICATIONS

International Search Report for PC/US02/31766, Mailed Jan. 17, 2003.

*Primary Examiner*—Saul Rodriguez
(74) *Attorney, Agent, or Firm*—Robert C. Haldiman; Grant D. Kang; Husch & Eppenberger LLC (57) ABSTRACT

A ratchet actuator for an ergonomic device has a thin profile due to the combination of multiple functions into single parts. A ratchet drive gear also has drive fingers for operating a clutch. A clutch stator has high and low steps for engaging and disengaging ratchet pawls.

21 Claims, 8 Drawing Sheets

U.S. PATENT DOCUMENTS

| | | |
|---|---|---|
| 5,593,210 A | 1/1997 | Schwarzbich ............ 297/361.1 |
| 5,609,394 A | 3/1997 | Ligon, Sr. et al. ....... 297/284.4 |
| 5,638,722 A | 6/1997 | Klingler .................... 74/502.4 |
| 5,651,584 A | 7/1997 | Chenot et al. ........... 297/284.4 |
| 5,681,005 A | 10/1997 | Ligon, Sr. et al. ....... 242/394.1 |
| 5,704,687 A | 1/1998 | Klingler ................. 297/284.4 |
| 5,769,491 A | 6/1998 | Schwarzbich ............ 297/284.4 |
| 5,794,479 A | 8/1998 | Schwarzbich ................ 74/143 |
| 5,842,659 A | 12/1998 | Ligon, Sr. et al. ....... 242/394.1 |
| 5,865,285 A | 2/1999 | Minkenberg et al. ......... 192/15 |
| 6,045,185 A | 4/2000 | Ligon, Sr. et al. ........ 297/284.4 |
| 6,050,641 A | 4/2000 | Benson .................... 297/284.4 |
| 6,158,300 A | 12/2000 | Klingler ...................... 74/526 |
| 6,178,838 B1 | 1/2001 | Schwarzbich ................ 74/143 |
| 6,227,617 B1 | 5/2001 | von Moller .............. 297/284.4 |
| 6,230,867 B1 | 5/2001 | Schwarzbich ............ 192/223.2 |
| 6,238,123 B1 | 5/2001 | Schwarzbich ................ 403/45 |
| 6,345,549 B1 | 2/2002 | Lance ...................... 74/500.5 |
| 2002/0043849 A1 | 4/2002 | Denis ...................... 297/344.1 |
| 2003/0062749 A1 * | 4/2003 | Liu et al. ................. 297/284.4 |

* cited by examiner

APPARATUS AND METHOD FOR THIN PROFILE RATCHET ACTUATOR

CROSS-REFERENCE TO RELATED APPLICATIONS

This application is a Continuation In Part of application Ser. No. 09/970,268.

STATEMENT REGARDING FEDERALLY SPONSORED RESEARCH OR DEVELOPMENT

None

BACKGROUND OF THE INVENTION

1. Field of the Invention

The present invention is in the field of mechanical actuators, particularly tension or traction device actuators, especially as used in automotive or furniture ergonomic mechanisms such as lumbar supports.

2. Prior Art

Ergonomic mechanisms such as lumbar supports are typically adjustable by mechanical means which may be activated and controlled at certain expense by motors, and at a lesser expense by levers, handwheels and the like. There is a continuing need for simplicity, durability and cost control in this area.

Ergonomic mechanisms are commonly designed to retain particular settings chosen by a repeat user for his or her individual comfort. Retaining an adjustment is often achieved by keeping a device like a lumbar support under pressure or tension, as by a traction cable. Settings need to be maintained through loading and unloading cycles, requiring brakes or locks for holding the settings. Serial adjustment must remain possible, requiring releases, overrides or clutches. In high volume markets such as automobiles or furniture, reducing costs and simplifying assembly of these multiple components are constant needs.

Simple levers are desirable adjustment devices, especially for automobiles. However, once a user selects a position for a device such as a lumbar support, the corresponding lever position frequently protrudes at an inconvenient angle. In automobiles, this can be particularly problematic in that clothing, seat belts and the like are easily caught on a lever that protrudes from the seat back where such levers are usually mounted. There is a need for a lever that can actuate an ergonomic mechanism like a lumbar support, maintain the selected position of it, and keep the lever in a home position where it is minimally intrusive.

The invention of parent application Ser. No. 09/970,268 is a ratcheting, locking clutch actuator, particularly for selectively positionable ergonomic devices like lumbar supports. It uses a novel hanging scissors ratchet and lever to drive a geared shaft through a pre-selected number of degrees and thereafter return the lever to a home position.

Drive direction is selectable by a pair of facing ratchet pawls. Lever homing is by a biasing spring. The scissors ratchet is combined with a releasable, overrunning clutch and lock assembly.

A ratchet arm offsets the scissors ratchet from a drive shaft. The lever shaft is preferably co-axial with a drive gear, and also with a retaining ring and eccentric hub which comprise a clutch. The clutch hub is engaged with a pulley in a pulley housing, again in a preferably co-axial configuration. The pulley is tractively engaged with one end of a tensioning cable. The other end of the cable is operatively engaged with a ergonomic device, such as a lumbar support.

Turning the lever one or more times through a pre-configured arc advances the pulley one direction to draw the cable into a selected position. The locking hub retains the pulley cable at the selected position while the ratchet/spring assembly homes the lever. Turning the lever the opposite direction reverses the drive gear and shaft, releasing the locking clutch hub and paying out the cable via the counter rotating pulley until a second selected position is reached, whereupon the second position is again locked by the clutch hub and the lever again homed by the biasing spring.

There remains a continuing need in the art for reducing the size and the profile of the assembled actuator. There also remains a continuing need in the art for easing and streamlining assembly of the component parts of the ratchet actuator. Finally, there is a continuing need to reduce the number, and consequently the expense, of the components to be assembled into ratchet actuators.

SUMMARY OF THE INVENTION

The present invention is a ratcheting, locking clutch actuator, particularly for selectively positionable ergonomic devices like lumbar supports. The present invention uses the novel hanging scissors ratchet and lever of parent application Ser. No. 09/970,268 to drive a geared shaft through a pre-selected number of degrees and thereafter return the lever to a home position.

The novel components of the present invention improve the ratchet actuator disclosed in the parent application by reducing the number of component parts, easing assembly and reducing the size of the assembled actuator. To achieve this, the drive gear and drive wheel of the present actuator have been combined.

The clutch ring has been deployed such that its outer surface may be used for stepping the ratchet pawls.

A coil lever arm return spring has been substituted for a leaf lever arm return spring.

The ratchet pawls, together with their pin assemblies, have been made symmetrical.

Further features and advantages of the present invention, as well as the structure and operation of various embodiments of the present invention, are described in detail below with reference to the accompanying drawings.

DETAILED DESCRIPTION OF THE PRESENT INVENTION

Ergonomic Mechanism Operation

Figure 1:
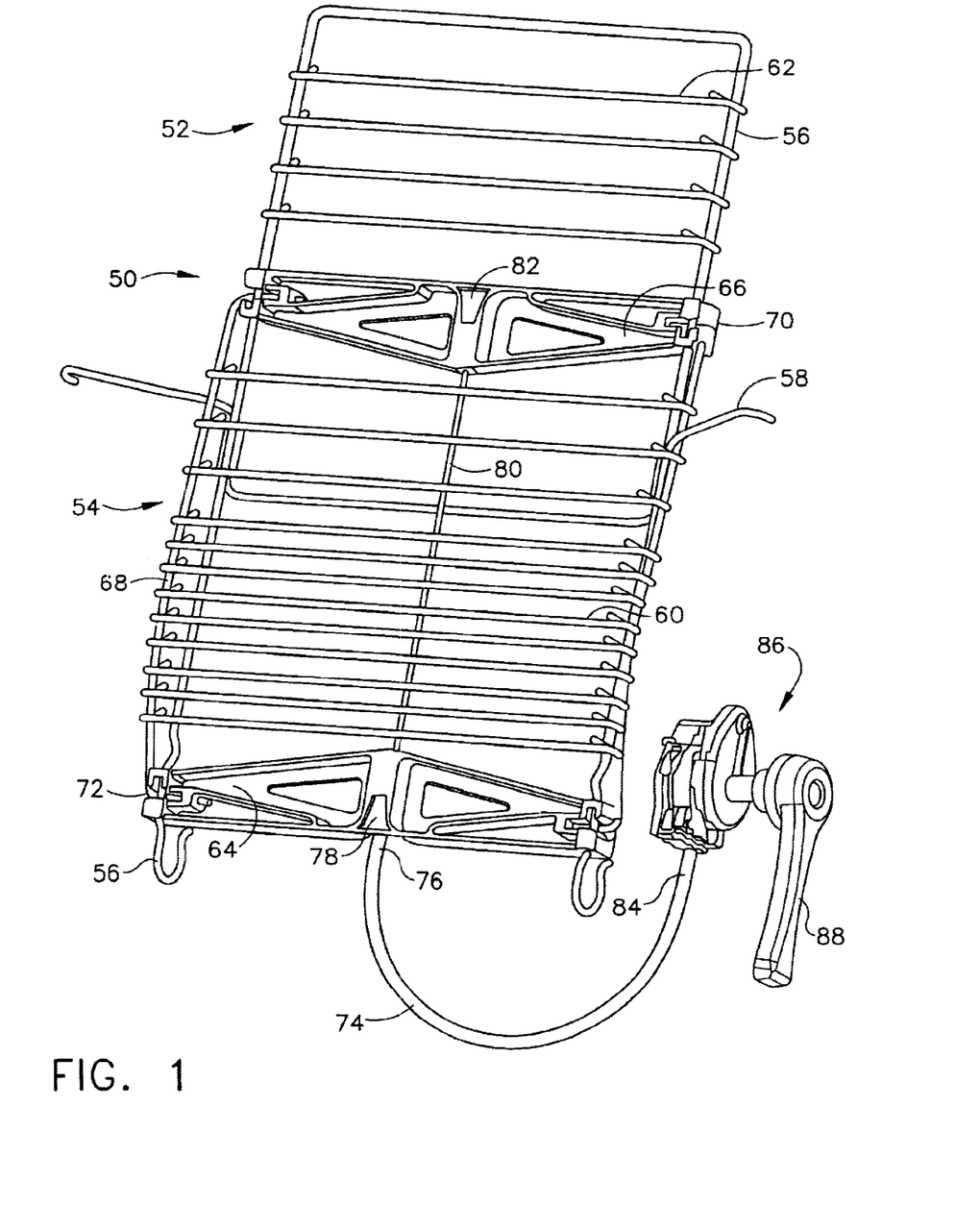
FIG. 1 is a perspective view of a typical ergonomic device—a lumbar support—with a ratchet actuator.

Referring to the figures where like reference numbers indicate like elements, FIG. 1 is a perspective view of a typical ergonomic device—a lumbar support—with a lever actuator like the ratchet actuator of the present invention installed. Lumbar support, 50, has a fixed portion, 52, and an arching portion, 54. Guide rails, 56, are mounted to a seat frame (not shown) with mounting mechanisms, 58. A plurality of lateral elements, 60, span the archable portion of the lumbar support and, in the pictured example, lateral elements, 62, also traverse the fixed portion, 52, of the lumbar support.

Also disposed on guide rails, 56, are two brackets comprised of a fixed lower bracket, 64, and sliding upper bracket, 66. Two archable pressure surfaces, 68, in this case metal rods, run generally vertically and, when flat, are generally parallel to guide rails, 56. The archable pressure rods, 68, are pivotally mounted to the upper bracket at pivot mounts, 70, and pivotally mounted to the lower bracket, 64, at pivot mounts, 72. When upper bracket, 66, is made to slide downwards towards lower bracket, 64, pressure rods, 68, are made to bow, which arches lateral elements, 60, towards a seat occupant creating an arched lumbar supporting surface.

One of the most common mechanisms used to move mounting brackets 64 and 66 towards one another is a traction cable. Particularly common is a bowden cable, as depicted in FIG. 1. The bowden cable is comprised of an outer, flexible sleeve, 74, which retains and directs a wire, 80, within the sleeve which can slide co-axially in and out of the sleeve. In FIG. 1, the bowden cable sleeve, 74, has an end, 76, mounted to the lower bracket, 64, at a bowden cable mounting bracket, 78. Bowden cable mount, 78, acts as a stop to bowden cable sleeve end, 76, but allows sliding passage therethrough of bowden cable wire, 80. Bowden cable wire, 80, proceeds vertically upwards to where it is mounted to upper sliding bracket, 66, at a traction cable mounting point, 82. An opposite bowden cable sleeve end, 84, is mounted at the actuator, 86. The actuator applies traction to the bowden cable wire, 80, when a seat occupant rotates the lever, 88. The lever may alternatively be a handwheel or other device giving mechanical advantage. This tractive force draws the bowden cable wire, 80, through the bowden cable sleeve, 74, causing the bowden cable wire, 80, to pull the sliding upper bracket, 66, towards the first bowden cable sleeve end, 76, which in this case pulls the sliding upper bracket, 66, downwards towards the lower bracket, 64, along guide rails, 56. As described above, tractive movement of the upper mount, 66, towards the lower mount, 64, bows the pressure rods, 68, outwards in a lumbar supporting arch.

Pressure rods, 68, are biased towards their flat position. Accordingly, when there is no tension on bowden cable wire, 80, the arching pressure surface, 54, of lumbar support, 50, returns to a rest position that is generally flat.

Hence, it is apparent that the most rudimentary function of any actuator is to draw the bowden cable wire, 80, through the bowden cable sleeve, 74. If an alternative traction device were elected as a design choice, the most rudimentary function of an actuator would remain to draw the tractive element, whether it is a rod, cable, or otherwise, in a direction applying tractive force to actuate the ergonomic mechanism. The present invention may be applied to any such tractive devices. In another alternative design choice, compressive pressure may be used to bow an archable surface. The present invention may likewise be used to drive such a compressive mechanism.

Figure 3:
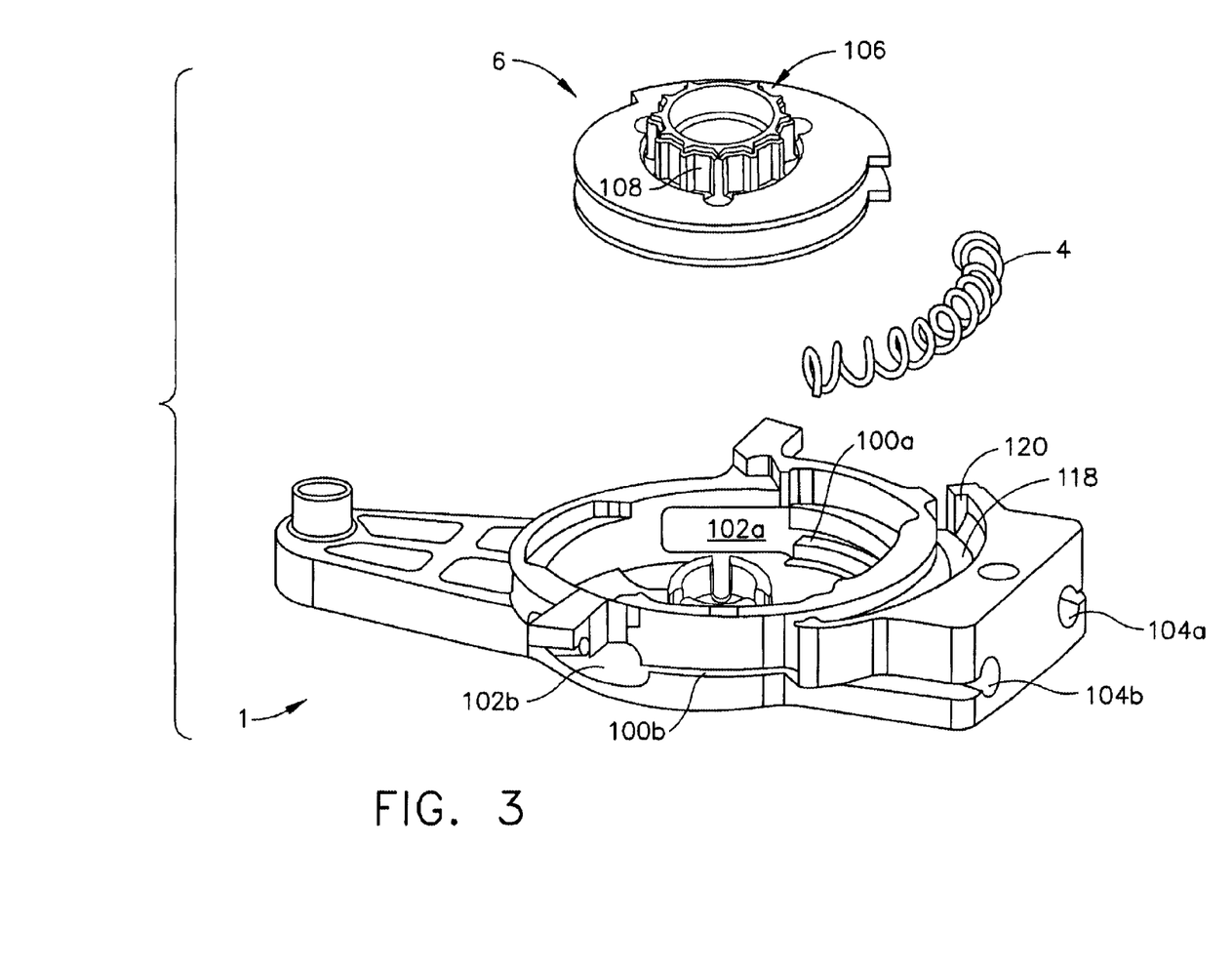
FIG. 3 is a close up of the base housing and pulley.
Figure 4:
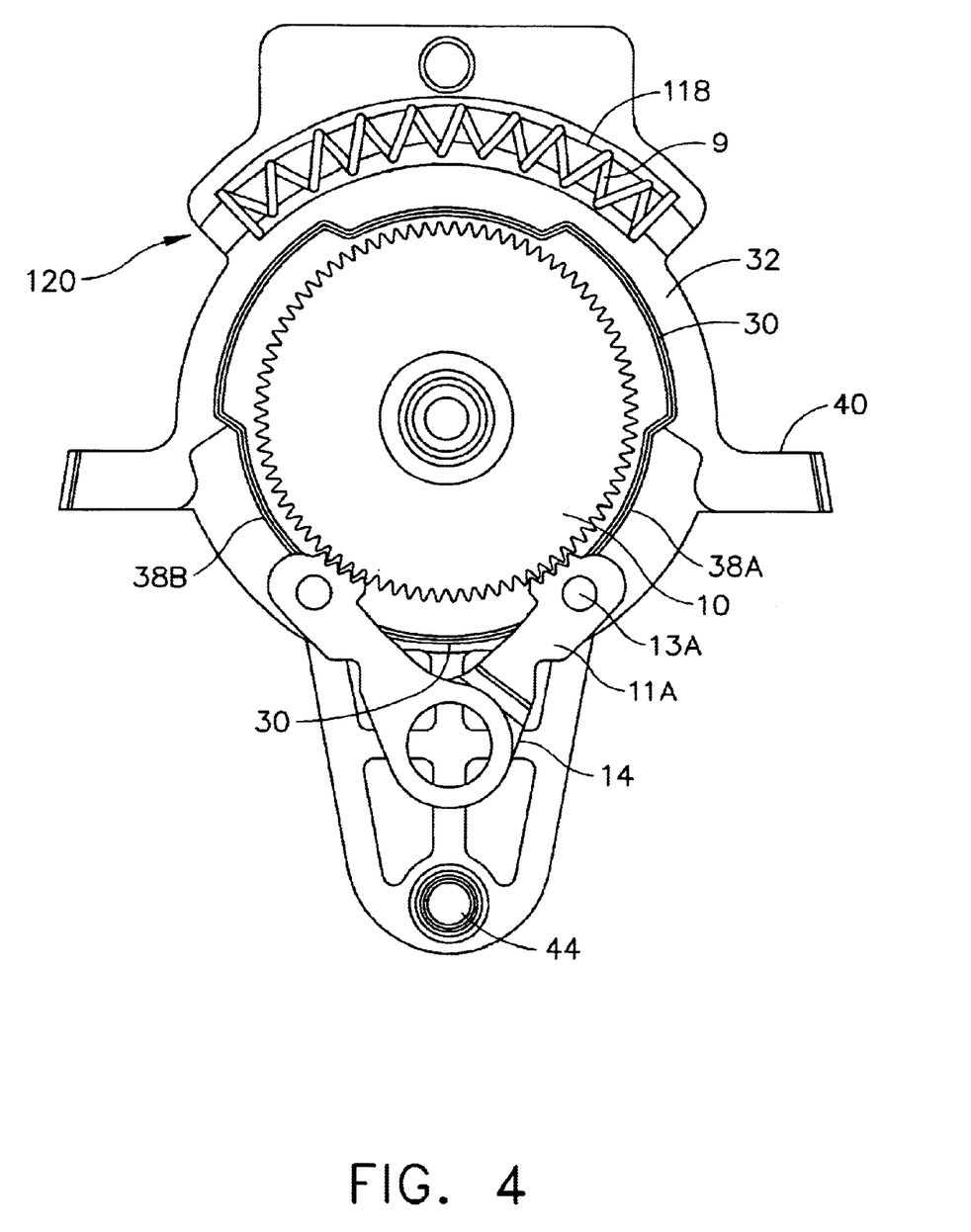
FIG. 4 is a top view of the scissors ratchet of the present invention.

FIG. 3 is a close up of the base housing, 1, and pulley, 6. The bowden cable (not shown) is assembled with the pulley, 6, and base housing, 1 as follows. Either of slots, 100A and 100B, allow insertion of a bowden cable wire, 80 (or other traction wire) into the base housing, 1. Wider portions, 102A and 102B, of slots 100, allow insertion of a cable wire end stop. Exit holes, 104A and 104B, serve as both passage ways for travel of the bowden cable wires, 80, and as stops for bowden cable sleeve ends, 84. The corresponding opposite slots and exits, 100, 102 and 104, on opposite sides of base housing, 1 allow for reverse installation of a bowden cable wire, so that the ratchet actuator may be installed for actuating either clockwise traction or counterclockwise traction in order to accommodate seat design flexibility such as would be useful in installing mirror image actuators on outboard sides of both a driver's and a passenger's side seat.

Pulley, 6, has a notch, 106 (obscured) for receiving installation of the bowden cable wire end stop. The bowden cable wire, 80, would then be wrapped partially around pulley, 6, and lead out through either exit hole, 104. In this configuration, rotation of pulley, 106, wraps the bowden cable, 80, further around pulley, 106, which effects a shortening of the bowden cable wire, 80, at the opposite end of the bowden cable, 80. This shortening also draws the bowden cable wire, 80, through the bowden cable sleeve, 74, applying the desired traction to the ergonomic mechanism to which the other end of the bowden cable wire, 80, and bowden cable sleeve, 74, are attached.

Pulley, 106, further has a cylindrical extension, 108, with notches corresponding to a central hole in locking hub, 4, for a rotationally fixed assembly of pulley, 6, with hub, 4.

Alternatively and equivalently, rotational force transferred by the ratchet and clutch combination of the present invention could be converted into tractive force by mechanisms besides a pulley and cable, as, for example, a rack and pinion or a cam and push rod.

Referring back to FIG. 1, in operation a seat occupant turns lever arm, 88, which rotates ratchet arm, 402. Rotation of ratchet arm, 20, moves scissors ratchet, 11, along its arcuate path, causing its ratchet teeth to engage with drive gear, 10. The downwardly disposed fingers, 204, of gear, 10, engage the bosses, 200, of eccentric hub, 4, also driving it in the same rotational direction as drive gear, 10. Eccentric hub, 4, through notched extension, 108, of pulley, 6, drives pulley, 6, in the same rotational direction. Rotation of pulley, 6, either draws in or plays out bowden cable wire (not shown) which is partially wrapped around pulley, 6, through one of the holes, 104, of base housing, 1. Accordingly, tension on bowden cable wire is increased or decreased causing a corresponding narrowing or widening of the space between mounting brackets, 66 and 64, on lumbar support, 50, which in turn increases or decreases an arch in pressure rods, 68.

The Locking Hub Clutch

Figure 5:
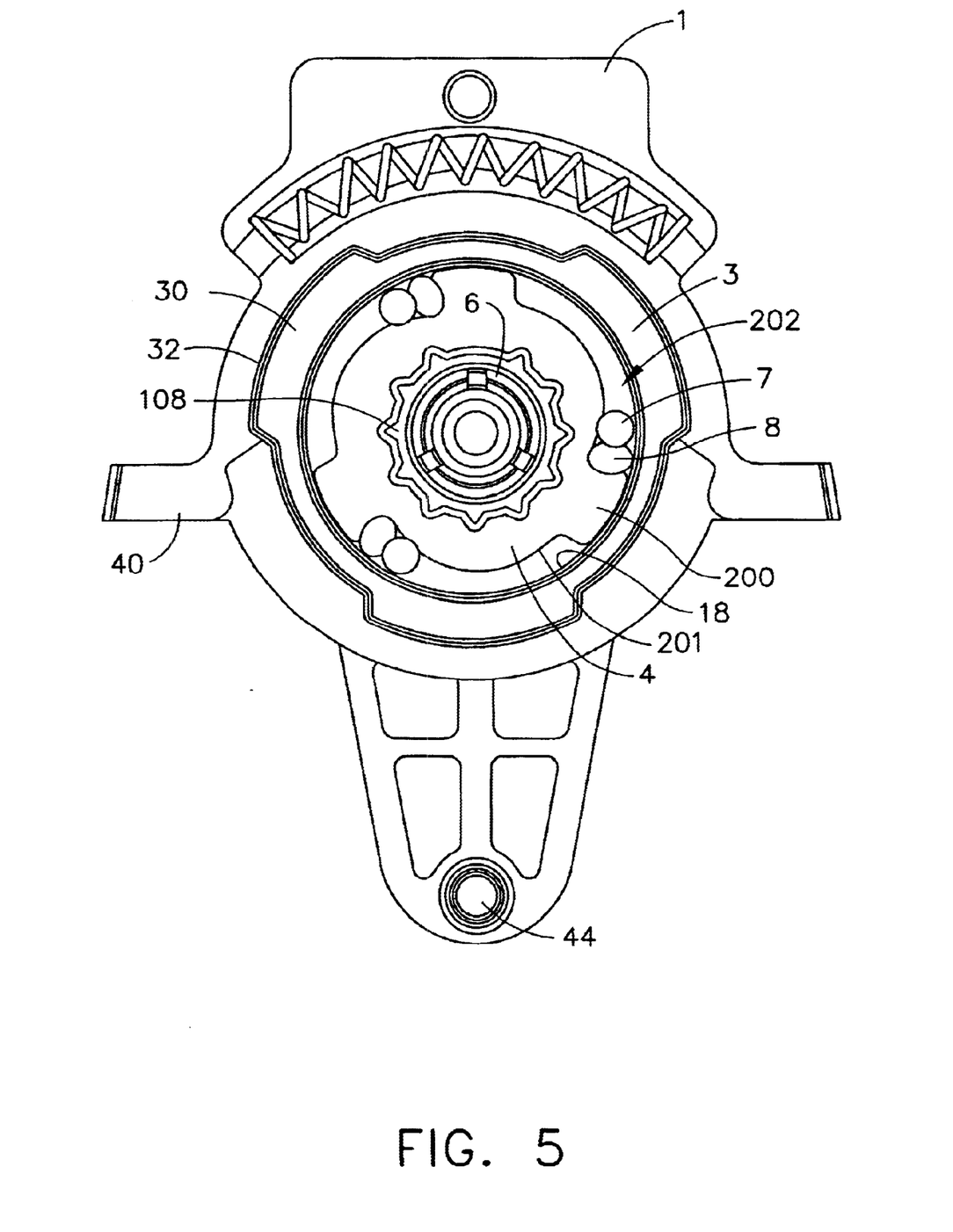
FIG. 5 is a top view of the locking clutch.
Figure 6:
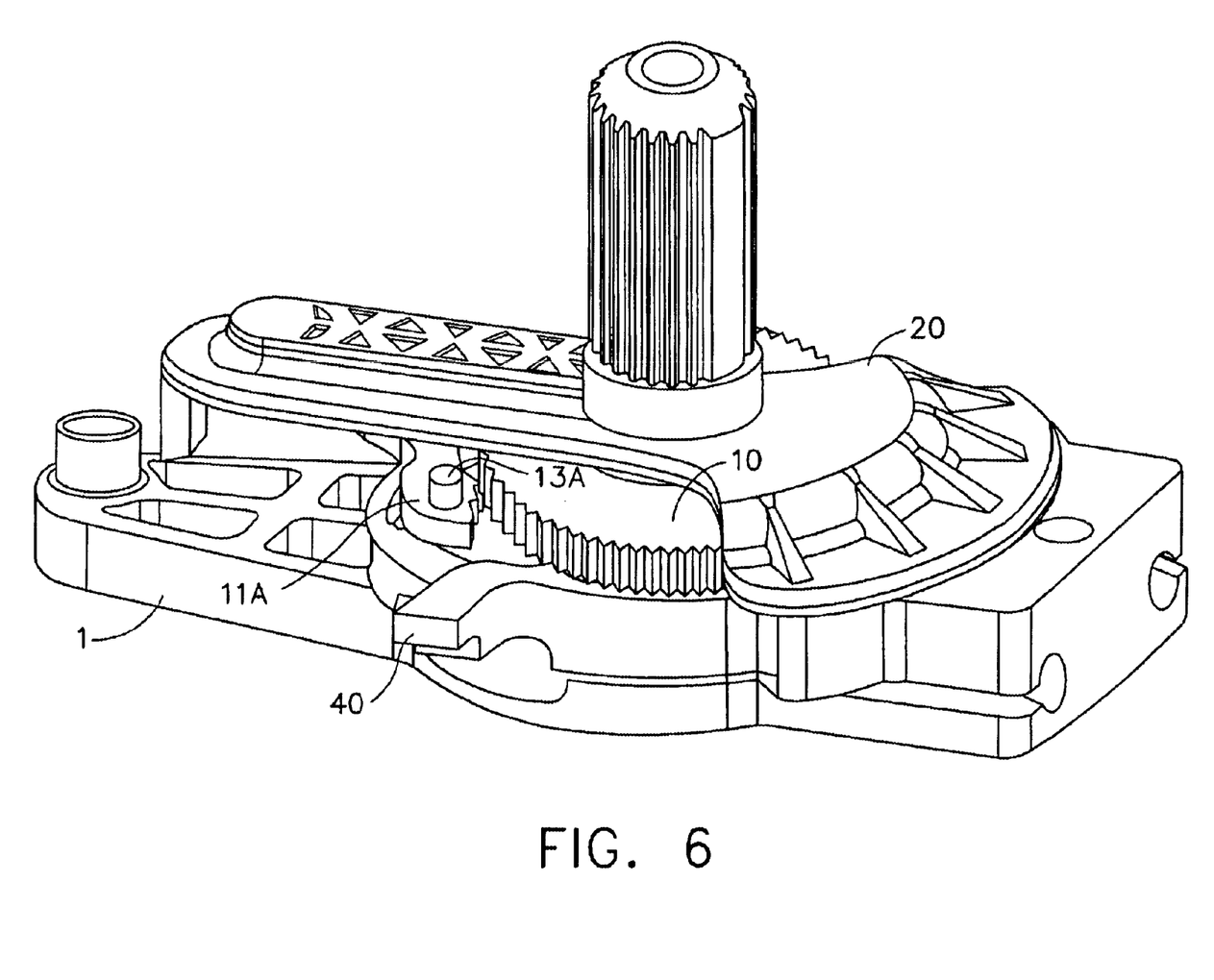
FIG. 6 is a perspective view of the thin profile ratchet actuator with the top housing removed.
Figure 7:
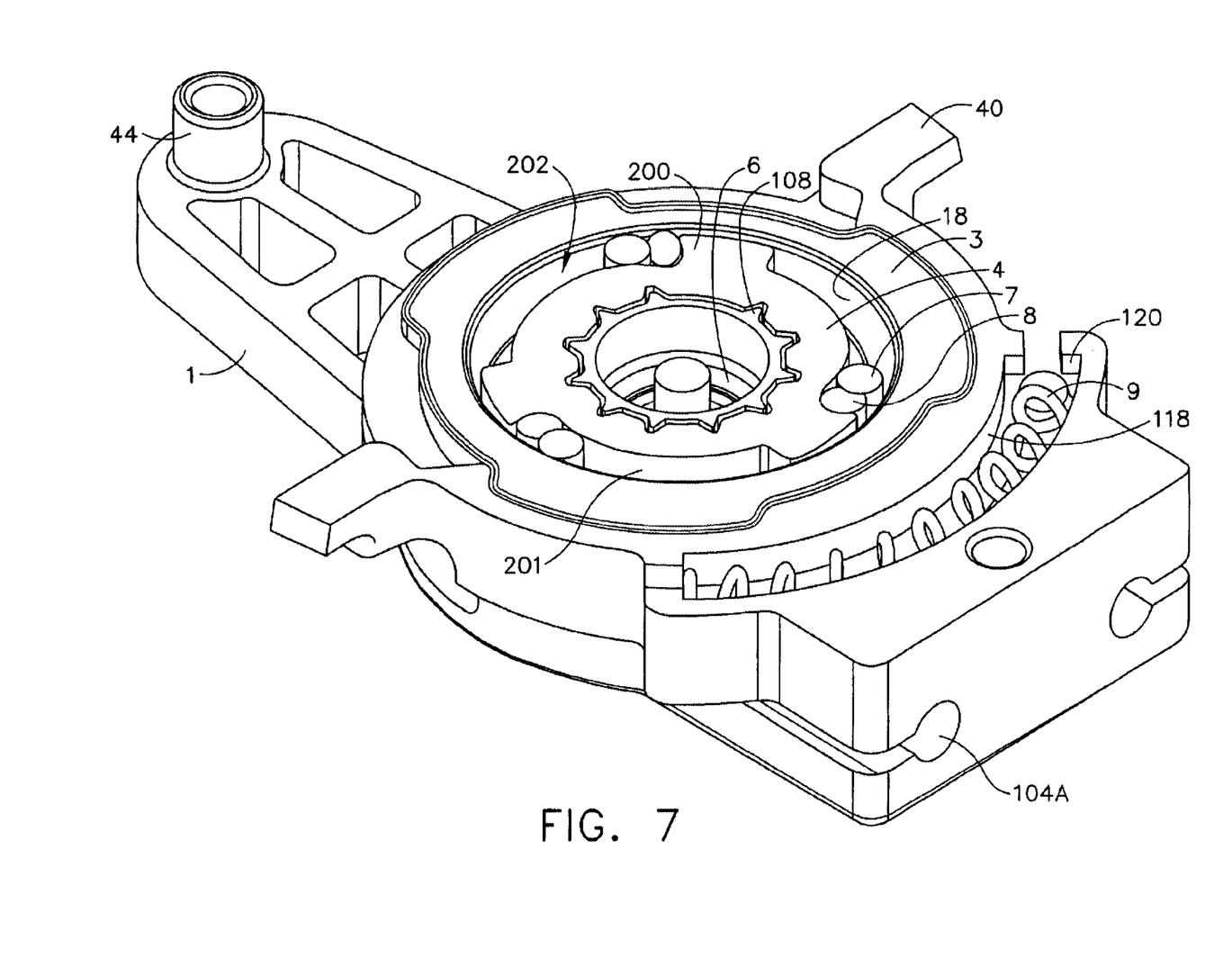
FIG. 7 is a perspective view of the locking clutch of the thin profile ratchet actuator.
Figure 8:
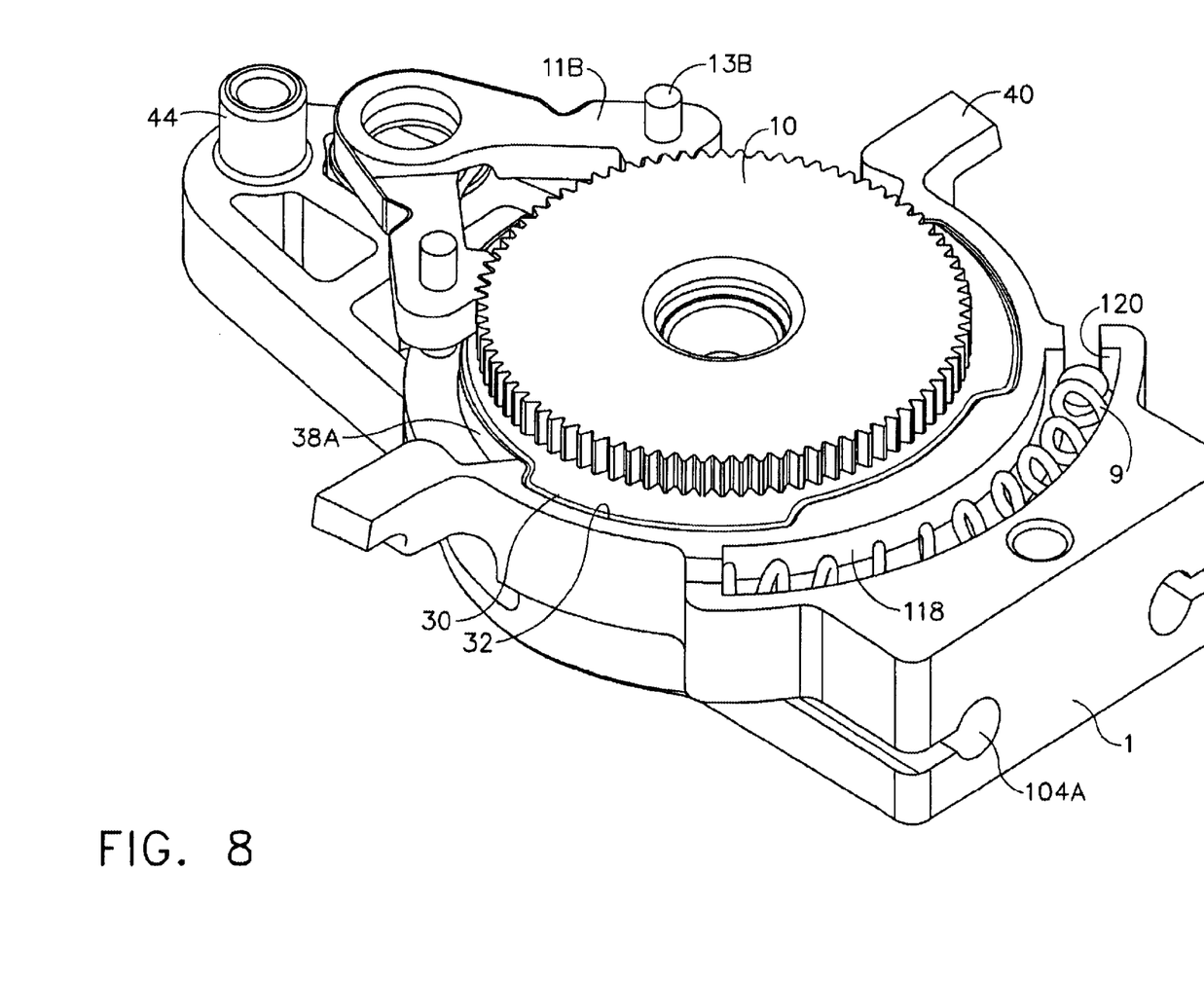
FIG. 8 is a perspective view of the thin profile ratchet actuator of the present invention with the top housing and ratchet arm removed.

FIG. 5 is a top view of the assembled locking hub, overrunning clutch of the present invention. FIG. 7 is a perspective view. Top housing 2, ratchet arm, 20, pawls, 11, and drive gear, 10, have been removed. Visible in FIGS. 5 and 7, are base housing, 1, hub, 4, steel rollers, 7, and rubber grommets, 8, as well as ring, 3. Pulley, 6, is below the locking hub, 4, and ring, 3. Only the top shaft extension of pulley, 6, is visible in FIGS. 5 and 7, where its notched shaft, 108, interlocks with hub, 4.

Hub, 4, has, preferably, three bosses, 200. Any number of bosses may be used. The top of these bosses comprise an outer radius of hub, 4, which is disposed in rotating, sliding cooperation with the inner surface 18 of ring, 3. The edge, 201, of hub, 4, between bosses, 200, has a radial distance from the center of hub, 4, that is less than the outer or top surface of bosses, 200. As assembled, this inner surface of the edge, 201, of hub, 4, combines with the inner surface, 18, of ring, 3, to form spaces, 202. Disposed within these spaces are rubber grommets, 8, steel rollers, 7, and the downward protruding fingers, 204, of drive gear, 10. Hub edge, 201, is preferably arcuate, but may be generally flat, provided that the space it defines when assembled with ring, 3, is a constricting channel. Alternatively, the inner surface, 18, of ring, 3, may be eccentric.

In FIGS. 5 and 7, spaces, 202 are narrower at their counterclockwise extremity than they are at their clockwise extremity. Rubber grommet 8 is disposed at the extreme clockwise extremity of spaces, 202, where, preferably, it seats into a corresponding convexity in the side wall of bosses, 200. Proceeding in a counter-clockwise direction, each space, 202, has disposed in it rubber grommets, 8, steel rollers, 7, and the fingers, 204, of drive gear, 10. (The fingers are not shown in FIGS. 5 and 7.) At its clockwise extremity, spaces, 202, are wider in the radial direction than the diameter of either steel rollers, 7, or rubber grommets, 8. Accordingly, hub, 4, can be freely moved in a counter-clockwise direction. However, space, 202, is radially narrower than the diameter of steel roller, 7, at the counter-clockwise extremity of each of spaces, 202. Accordingly, if hub, 4, is rotated in a clockwise direction, at some point between the clockwise extremity of space, 202, and the counter-clockwise extremity of space, 202, steel roller, 7, will become unable to fit between the edge, 201, of hub, 4, and the inner surface, 18, of ring, 3. At that point the steel roller will jam or "lock" and prevent further rotation of the hub. All components attached to the hub, specifically pulley, 6, are also prevented from proceeding any further in the clockwise direction. This is the locking feature of the hub, 4, and ring, 3, clutch assembly.

The point at which roller, 7, locks may be anywhere between grommet, 8, and drive disk finger, 204. Preferably, the locking point is close to the free or resting position of roller, 7, as depicted, in order that the clutch have a quick locking response and little "play."

Rubber grommets, 8, are disposed between bosses, 200, and steel rollers, 7. Their purpose is to act as a spring, biasing the steel rollers towards that point in the space, 202, at which they lock and prevent further rotation of hub, 4. This biasing prevents an undesirable back rotation of the assembly after the seat occupant releases the lever arm 88. Biasing the steel rollers, 7, to a point at or near where they lock also minimizes back rotation or "play" after a drive rotation of the lever arm, 88. This consequently maximizes the useful portion of the drive arc of the lever arm, 88. Although rubber grommets are preferred as springs, coil, leaf or other types of springs may be used. Rubber grommets, 8, and steel rollers, 7, are preferably cylindrical although other shapes, such as ball bearings or eccentric cylinders, may be used.

As mentioned, drive gear, 10, has fingers, 204, which also extend downward into spaces, 202. These fingers are disposed to abut bosses, 200, on the side of the boss opposite the rubber grommet. In operation, when the lever arm, 88, is rotated by a seat occupant in a counter-clockwise direction, the fingers, 204, of drive gear, 10, are brought into driving contact with the bosses, 200. This rotational force drives hub, 4, counter-clockwise, widening gap, 202, relative to steel roller, 7, and releasing it. Continued rotation of the drive gear, 10, turns the hub, 4, and pulley, 6, through as many degrees as the ratchet actuator, 86, is configured to turn. Upon reaching the end of the rotating arc, pressure is released from fingers, 204, of drive gear, 10, when the seat occupant releases the lever arm, 88. The tension in the lumbar support biases the bowden cable wire, 80, and pulley, 6, to which it is attached in a reverse or clockwise direction. However, travel of the assembly in the reverse or clockwise direction is halted by the nearly immediate locking of the steel roller, 7, between the locking hub edge, 201, and inner surface, 18, of ring 3. In this fashion, the seat occupant may continue to arch the lumbar support by ratcheting the actuator repeatedly until a desired degree of lumbar support arching is reached. Then the lever is homed by spring, 9, while locking hub, 4, and pulley, 6, remain held in place by a steel rollers, 7.

The weight of the seat occupant biases the lumbar support towards the flat position and keeps the bowden cable wire, 80, under tension. In order for a seat occupant to flatten an arched lumbar support, the lever arm, 88, must be pushed in the opposite direction. This has the effect of rotating the fingers, 204, of drive gear, 10, in the clockwise direction where they come into contact with steel roller, 7, and force them out of their locked position, thereby allowing the pre-existing tension in bowden cable wire, 80, to cause an unwinding of pulley, 6, corresponding to a clockwise rotation in hub, 4, which is unimpeded by locking of the steel roller, 7, for so long as the fingers, 204, of drive gear, 10, maintain clockwise pressure on steel roller, 7.

With hub, 4, installed in this orientation, bowden cable wire, 80, attaches to pulley, 6, through hole and slot assembly, 100A, 102A and 104A. Reversing orientation is simply a matter of turning over hub, 4, during assembly, rotating notch, 106, in pulley, 6, and installing bowden cable wire, 80, through the opposite slot, 106B, 102B and 104B. In this second orientation, clockwise is the drive direction and counterclockwise is the locked direction.

The Thin Profile Improvement

Figure 2:
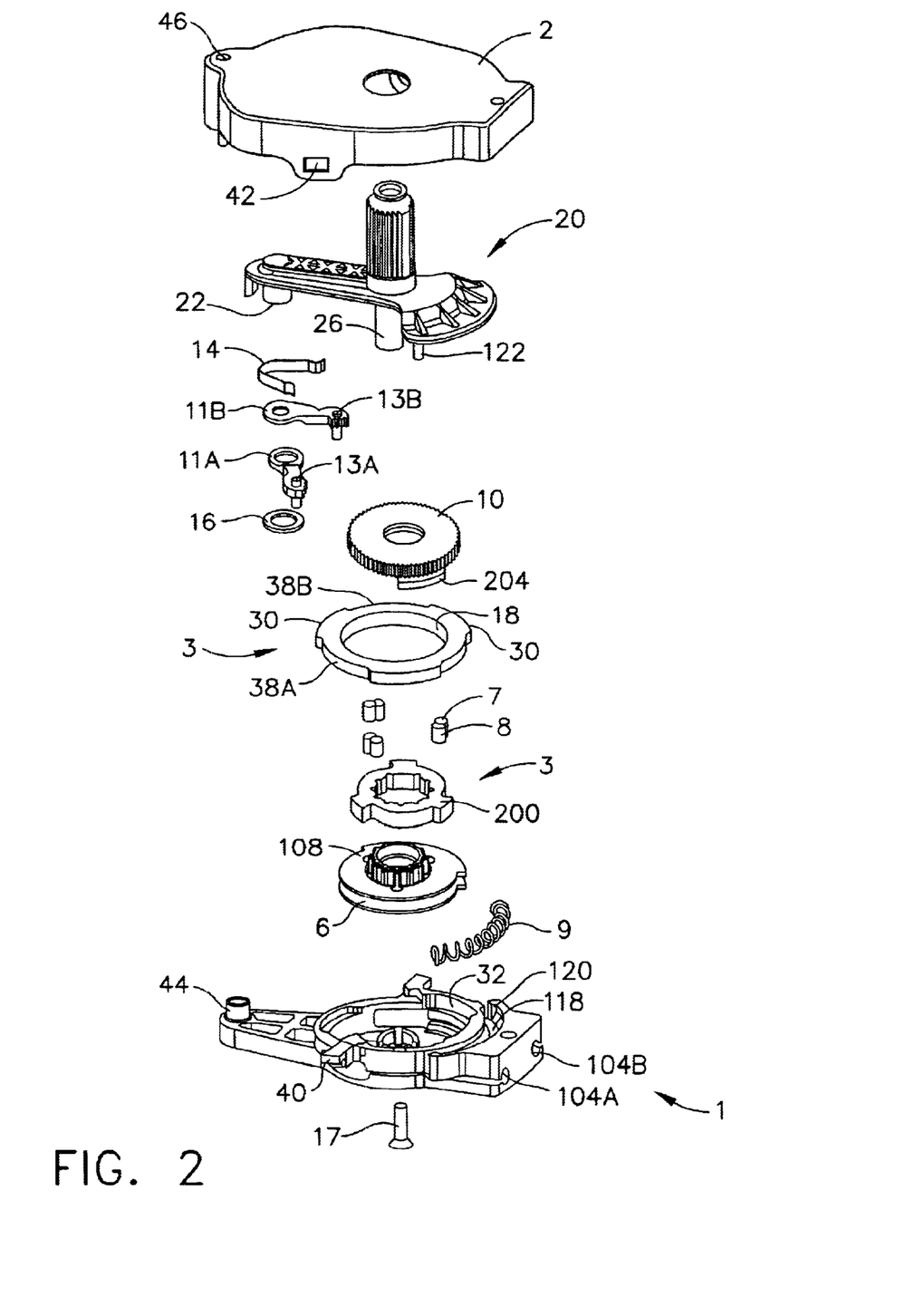
FIG. 2 is an exploded view of the ratchet actuator of the present invention.

FIG. 2 is an exploded view of the thin profile improvement of the ratchet actuator of the present invention. The assembled parts are encapsulated between base housing, 1, and top housing, 2. Base housing, 1, has a seat for receiving pulley, 6. Cable (not shown) is attached to pulley, 6, and exits base housing at exit aperture, 104A or 104B.

Base housing, 1, has an arcuate channel, 118, for receiving return biasing coil spring, 9. Retaining seats, 120, at either end of channel, 118, hold return biasing coil spring, 9, in place with only a slight degree of compression. This channel configuration, combined with the coil spring, is easy to assemble, since the coil spring, 9, need merely be placed in channel, 118. Leaf springs typically have to be held in place between two other components while those components are assembled (such as the ratchet arm housing, 12, and upper housing, 2, of the parent application).

Seats, 120, incorporate slots which are thinner than the diameter of coil spring, 9. These slots receive ratchet arm fingers, 122, when a seat occupant turns the lever (not shown) and consequently turns ratchet arm, 20. This action of moving ratchet arm fingers, 122, into compression of spring, 9, loads the spring. When the seat occupant releases the lever, spring, 9, expands, pushing finger, 122, and consequently ratchet arm, 20, back to its home position.

The operation of hub, 4, rubber grommets, 7, and rollers, 8, in their interaction with the inner surface, 18, of ring, 3, is as previously described for the locking clutch assembly.

Ring, 3, has three bosses, 30 on its outer aspect. These correspond to seating detents, 32, in base housing, 1. Once assembled, the detents, 32, serve to retain ring, 3, in a fixed position.

In the improvement of the present invention, ring bosses, 30, are also used as steps to mediate the travel of pawls, 11A and 11B. Bosses, 30, engage and disengage scissors ratchet pawls, 11A and 11B, via sliding contact with scissors pawl pins, 13A and 13B. The bosses, 30, of ring, 3, become the high step to disengage the non-driving scissor pawl arm by holding the non-driving scissors pawl arm away from the drive gear teeth on drive gear, 10, while the other scissors pawl is in driving engagement with the teeth of drive gear, 10. The disengagement is maintained by the greater radius of the high step, 30. Ring, 3, has detents, 38A and 38B, on either side of boss, 30. These comprise the low steps. The driving ratchet pawl pin remains in sliding engagement with low step, 38A or 38B. Contact between the high step, 30, and the low steps, 38A and 38B, of ring, 3, and the ratchet pawl pins, 13A and 13B, is made possible by raising the seating of ring, 3, above the base housing, 1. Base housing seating detents, 32, receive ring, 3. However, seating detents, 32, are not as deep as ring, 3, is tall. Accordingly, the height of ring, 3, extends above the height of base housing, 1. Ring, 3, extends high enough to bring its outer surface components, high step, 30, and low steps, 38A and 38B, into sliding contact with ratchet pawl pins, 13A and 13B. Accordingly, an intermediate housing with steps for mediating the travel of ratchet pawls has been entirely eliminated, thus thinning the profile of the improved ratchet actuator of the present invention.

The size of the improved ratchet actuator of the present invention is further reduced by combining the drive wheel and drive gear of the previous embodiment into a single part. Drive gear, 10, is circumscribed by teeth to receive driving engagement with the teeth of ratchet pawls, 11A and 1B. From this same drive gear, 10, descend the fingers, 204, which extend downward into operative engagement with the locking hub, 4, grommets, 7, and rollers, 8, of the locking clutch assembly.

The elimination of components by combining their operative aspects into fewer parts reduces costs, eases assembly, and reduces the overall size of the improved ratchet actuator of the present invention.

Assembly has been eased further by improving the design of the ratchet pawl pins, 11A and 11B. They are symmetrical. In their assembly with pins, 13A and 13B, they remain symmetrical. Pins, 13A and 13B, extend an equal distance above and below pawls, 11A and 11B. Accordingly, an assembler need not distinguish left and right ratchet pawl pins, but need only turn one of the ratchet pawls over to create the scissors pawl assembly of the present invention. The scissors pawls are disposed on post, 22, of ratchet arm, 20. They are held in place by locking washer, 16.

Pawl biasing spring, 14, eases assembly of the present invention relative to prior embodiments by being a band spring. Prior art leaf springs required its own insertion onto ratchet post, 22, and followed by simultaneous engagement with pawls, 11A and 11B, as pawls, 11A and 11B, were also disposed on post, 22. Assembly of the improved ratchet actuator of the present invention is by sliding ratchet pawls, 11, onto post, 22, and afterwards snapping into place the band spring, 14.

Ratchet arm, 20, has a drive shaft, 24, that extends through a hole in top housing, 2, to receive fixed attachment to a lever arm (not shown). Internalization of the support for the hanging scissors pawl ratchet protects these moving parts from jamming, interference or contamination. Ratchet arm, 20, has a shaft, 26, extending through the axis of the parts below, including the base housing, 1, to where it receives anchoring screw, 17. Tabs, 40, on base housing, 1, are snapped into slots, 42, in top housing, 2, for final assembly. Also, base housing post, 44, engages top housing post hole, 46, to further secure the assembly of the ratchet actuator and encapsulate the moving scissors pawl.

In operation, a seat occupant turns lever arm (not shown), which turns ratchet arm, 20, which through scissors pawl post, 22, brings a ratchet pawl, 11A, into driving engagement with gear, 10. Biasing spring, 14, maintains ratchet pawl post, 13A, in sliding engagement with low step, 38A, of ring, 3. Opposing ratchet pawl, 11B, is maintained in a disengaged position from the teeth of drive gear, 10, by sliding engagement of post, 13B, with high step, 30, of ring, 3. The driven rotation of gear, 10, causes drive gear fingers, 204, to push rollers, 8, and grommets, 7, against bosses, 200, of locking hub, 4. This turns pulley, 6, which is in fixed engagement with locking hub, 4. Turning pulley, 6, pulls the cable (not shown) through an exit aperture, 104A or 104B.

Rotation of ratchet arm, 20, also drives ratchet arm finger, 122, into compression of return biasing coil spring, 9. When the seat occupant releases the lever arm (not shown) the locking wedge action of the cam surfaces of locking hub, 4, holds locking hub and pulley, 6, at the degree of rotation selected by the seat occupant with the lever arm. Ratchet arm, 20, remains free to move, however, and is driven to move to its home position by the expanding action of return biasing coil spring, 9, which pushes ratchet arm, 20, home through its expanding engagement with ratchet arm finger, 122.

In view of the foregoing, it will be seen that the several advantages of the invention are achieved and attained.

The embodiments were chosen and described in order to best explain the principles of the invention and its practical application to thereby enable others skilled in the art to best utilize the invention and various embodiments and with various modifications as are suited to the particular use contemplated.

As various modifications could be made in the constructions and method herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A ratchet actuator comprising:

a lever;

a ratchet arm having a drive axis and a ratchet axis, said ratchet arm being fixed to said lever at said drive axis;

a ratchet comprising:
    a ratchet post, said ratchet post being coaxial with and fixed to said ratchet arm ratchet axis;
    a first pawl having a first end in rotating communication with said ratchet post and having a second end, said second end having teeth and a pin;
    at least one second pawl having a first end in rotating communication with said ratchet post and having a second end, said second end having teeth and a pin;
    a pawl spring biasing said first pawl second end towards said second pawl second end;

a drive gear having teeth, said drive gear teeth being dimensioned to mesh with said first and second pawl teeth and said drive gear being disposed to engage said pawls, said drive gear having at least two fingers projecting perpendicular to the plane of the gear;

a ring having a high step and at least one low step;
    each of said steps being disposed to mediate said pawl spring biasing of each of said pawls towards the other of each of said pawls by sliding contact with said pins;

such that when one of said first or second pawl pins is in contact with said at least one low step, the other of said pins remains in contact with said high step;

said low step being dimensioned to mesh said teeth of said one of said pawl ends having said pin contacting said low step with said teeth of said drive gear; and said high step being dimensioned to keep said teeth of said other pawl end having said pin contacting said high step disengaged from said drive gear teeth;

a hub having at least two bosses defining at least two spaces between said bosses;

said hub having at least two edges forming one side of each of said spaces and said each of said edges being dimensioned with a first hub distance and a second hub distance from a center of said hub with said edge being graduated from said first distance to said second distance, said hub being circumscribed by said ring, said ring having an inner surface, said inner surface being in sliding rotational communication with said bosses, said inner surface defining another side of each of said spaces, and said at least two spaces receiving said at least two fingers from said drive gear;

at least two locking rollers, disposed in said spaces said locking rollers being narrower in diameter than a distance between said ring inner surface and said hub edge first distance and said rollers being wider in diameter than a distance between said ring inner surface and said edge second distance; and at least two springs disposed between said bosses and said locking rollers such that said springs bias said locking rollers from said first distance and toward said second distance;

a traction element anchor; and a housing encapsulating said ratchet arm, said ratchet, said drive gear, said ring, said hub, said springs and said traction element anchor.

2. The ratchet actuator of claim 1 wherein said traction element is a compression element.

3. The ratchet actuator of claim 1 further comprising:
a traction cable having one end anchored to said pulley such that rotation of said pulley draws said traction cable.

4. The ratchet actuator of claim 3 wherein said traction cable is a bowden cable.

5. The ratchet actuator of claim 3 further comprising:
a traction cable having one end anchored to said pulley such that rotation of said pulley draws said traction cable, and a second end in operative communication with an ergonomic device.

6. The ratchet actuator of claim 5 wherein said ergonomic device is a lumbar support.

7. The ratchet actuator of claim 1 further comprising:
at least one boss fixed to said ratchet arm;
at least one channel disposed in said housing such that said ratchet arm boss has a home position relative to said housing; and
a spring disposed in said channel to bias said ratchet arm boss towards said home position.

8. The ratchet actuator of claim 1 wherein said lever, said ratchet arm, said drive gear, said ring, said locking hub and said traction anchor are co-axial.

9. The ratchet actuator of claim 1 wherein said edge of said hub is substantially straight between said first radius and said second radius.

10. The ratchet actuator of claim 1 wherein each of said hub detent edges has at least two first radiuses on either side of a generally central second radius, said second radius being a greater distance from the center of said hub than either of first radiuses.

11. The ratchet actuator of claim 1 wherein said locking rollers are eccentric in shape.

12. The ratchet actuator of claim 1 wherein said ring inner face is eccentric in shape.

13. The ratchet actuator of claim 1 wherein said clutch springs are rubber cylinders.

14. The ratchet actuator of claim 3 wherein said pulley is a pinion adapted to engage a traction element that is a rack.

15. The ratchet actuator of claim 1 wherein said lever is a handwheel.

16. The ratchet actuator of claim 1 wherein said pins extend an equal distance above and below said pawls.

17. The ratchet actuator of claim 1 wherein said pawl spring is a band spring.

18. The ratchet actuator of claim 7 wherein said spring is a coil spring.

19. A ratchet actuator for an ergonomic device comprising:
a housing;
a pulley rotatable within said housing, said pulley being adapted to draw a traction element;
a locking clutch encapsulated by a ring in said housing and disposed to control rotation of said pulley;
a drive gear in rotationally driving communication with said pulley through said clutch;
a ratchet in driving communication with said drive gear, said driving communication being mediated at least one step in said ring;
a lever in driving communication with said ratchet and rotationally fixed to said housing; and
a traction cable having a first end fixed to said pulley and a second end adapted to engage an ergonomic device;
whereby a first rotation of said lever in a first direction draws said traction cable to a position held by said clutch, and a second rotation of said lever removes said traction cable from said position.

20. The ratchet actuator for an ergonomic device of claim 19 wherein said second end of said traction cable is fixed to an ergonomic device and said ergonomic device is a lumbar support.

21. A method of actuating an ergonomic device comprising:
rotating a pulley via a lever, a ratchet and a drive gear;
controlling said rotating step by a clutch interaction step comprising:
freewheeling of said rotation in a selected first rotational direction upon application of rotational force in said selected first rotational direction;
locking said pulley from rotating in a second rotational direction opposite said selected first rotational direction upon removal of said rotational force in said first direction;
selectively releasing said locking of said clutch upon application of rotational force in said second rotational direction;

selectively applying rotational force in said first rotational direction or said second rotational direction with said lever and said ratchet by moving a first of two pawls into driving engagement with said drive gear in said first rotational direction while disengaging a second of said two pawls from said drive gear and by moving a second of said two pawls into driving engagement with said drive gear in said second rotational direction while disengaging said first of said two pawls from said drive gear;

mediating said selective application of rotational force via a high step and a low step on a ring circumscribing said clutch;

returning said lever to a neutral position via a spring in a housing channel when rotational force is released;

transferring said rotational force to tractive force via a cable having a first end attached to said pulley and a second end attached to said ergonomic device.

\* \* \* \* \*